United States Patent [19]

Plichta et al.

[11] Patent Number: 5,098,800

[45] Date of Patent: Mar. 24, 1992

[54] HIGH TEMPERATURE MOLTEN SALT BIPOLAR STACKED MODULE BATTERY

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 579,517

[22] Filed: Sep. 10, 1990

[51] Int. Cl.⁵ .......................................... H01M 10/39
[52] U.S. Cl. ...................................... 429/112; 429/66; 429/130; 429/133
[58] Field of Search ............... 429/66, 130, 131, 133, 429/112, 16, 37

[56] References Cited

U.S. PATENT DOCUMENTS

| | | | |
|---|---|---|---|
| 4,189,529 | 2/1980 | Birt et al. | 429/112 X |
| 4,345,009 | 8/1982 | Fahle et al. | 429/37 |
| 4,851,306 | 7/1989 | Kaun et al. | 429/112 |
| 4,973,531 | 11/1990 | Zaima et al. | 429/66 X |

*Primary Examiner*—Stephen J. Kalafut
*Attorney, Agent, or Firm*—Michael Zelenka; Roy E. Gordon

[57] ABSTRACT

A high temperature molten salt bipolar stacked module battery is provided in which electrolyte creepage between cells is shielded and compression maintained on the cell stacks during thermal cycling. In addition, the modular design of the individual cells lends this construction to high voltage battery make-up.

6 Claims, 1 Drawing Sheet

HIGH TEMPERATURE MOLTEN SALT BIPOLAR STACKED MODULE BATTERY

GOVERNMENT INTEREST

The invention described herein may be manufactured, used, and licensed by or for the Government for governmental purposes without the payment to us of any royalty thereon.

FIELD OF THE INVENTION

This invention relates in general to a high temperature molten salt battery and in particular to a high temperature molten salt bipolar stacked module battery in which there is shielding against any electrolyte creepage between cells and in which compression is maintained on the cell stacks during thermal

BACKGROUND OF THE INVENTION

High temperature molten salt batteries have been demonstrated as power sources for electric vehicle propulsion and suggested for load leveling in electric power plants. Their high rate capabilities ($A/cm^2$), rapid rechargeability, and high energy densities (>300Wh/kg) have been achieved through the use of highly conducting molten salt electrolytes. These salts are solid at ambient conditions and must be melted at temperatures above 300° C. to attain the highly conductive liquid phase. The most studied cells have been the lithium-metal-sulfides. Specifically, lithium-aluminum (20 weight percent Li) used as the anode, iron sulfides ($FeS_2$ or FeS) as the cathode and a eutectic mixture of LiCl-KCl as the electrolyte. Generally, magnesium oxide or boron nitride powders have been mixed with the electrolyte to provide rigid separation between the anode and cathode electrodes once the electrolyte is molten. Various electrode materials including metals, metal oxides, alloys and metal sulfides have been suggested for molten salt batteries. In addition, many salts and mixed salt eutectics have been studied in these cells. The development of practical molten salt batteries has been limited to parallel plate construction that uses individual current collector buses for each electrode. The respective positive and negative buses are then connected together to provide the desired battery voltage. Such a design although providing high energy densities does not lend itself to high rate—high power applications.

SUMMARY OF THE INVENTION

The general object of this invention is to provide a high temperature molten salt battery that will be suitable for high rate—high power applications. A more specific object of the invention is to provide such a battery that shields any electrolyte creepage between cells and maintains compression on the cells during thermal cycling.

It has now been found that the aforementioned objects can be attained by providing a bipolar cell design for molten salt batteries that acts to shield the electrolyte from creeping between neighboring cells as opposed to sealing. In the bipolar construction, a thin metal foil provides the electrical connection to the anode of one cell on one side and to the cathode of the next cell on the other side. Also known as a duplex electrode, the bipolar design has been used in Leclanche batteries. Obviously, the electrolyte of each cell must be restricted from coming in contact with neighboring cells or electrical shorting will occur. In molten salt batteries this type of construction is difficult since few materials exist that are capable of sealing the molten electrolytes. Generally, any seal used to immobilize the migration of the electrolyte from one cell to another has been unsuccessful. In this invention, the bipolar cell design for molten salt batteries acts to shield the electrolyte from creeping between neighboring cells as opposed to sealing. In addition, the battery is a modular cell design that is held in compression by high temperature springs that compensate for the thermal expansion and/or contraction of the cell stacks. The electrode stacks are modular so that an desired battery voltage in additive increments of the individual cell potentials can be obtained. This type of design lends itself to higher rates and electrochemical use that is desirable for pulse power applications.

DESCRIPTION OF THE DRAWING

Referring to FIG. 1, the high temperature molten salt cell module, 10 includes a molybdenum foil current collector, 12 that acts as the bipolar current collector between modules. Electrode disks including an anode disk, 14, a separator disk 16 and a cathode disk, 18 are stacked on top of the molybdenum foil current collector, 12. Also included in the stack is a current collector disk, 20, that can be made of metal, alloy, or graphite and must be thermally and chemically stable under the battery operating conditions. The cathode disk, 18 is comprised of an intimate mixture of pelletized powder cathode active material (80 to 90 weight percent) and electrolyte (20–5 weight percent). The separator disk, 16 is comprised of an intimate mixture of pelletized powdered MgO or BN (30 to 40 weight percent) and salt electrolyte (70 to 60 weight percent). The anode disk, 14 is comprised of an intimate mixture of pelletized powder LiAl (20 weight percent Li) alloy (80 to 100 weight percent) and salt electrolyte (20 to 0 weight percent). The disks 14, 16, 18, and 20 are stacked inside of a cylindrical boron nitride bushing, 22 that acts to immobilize the electrodes and prevent electrical edge shorting. The boron nitride bushing stacked electrode disks are stacked o top of the molybdenum foil current collector, 12 that acts as the bipolar current collector between modules. The diameter of the molybdenum foil current collector, 12 is the same as the outside diameter of the boron nitride bushing, 22 that contains the electrode disks. Thus, when a multiple cell stack is fabricated and the whole cell stack is heated to the operating temperature of the battery, the bipolar molybdenum foil will prevent the creepage of molten electrolyte from one cell module to the next cell module that would otherwise cause the electrical shorting of the cell stack.

Referring to FIG. 2, module A, 24 in the battery stack utilizes a high temperature stainless steel spring, 26 as the positive pole current collector. In subsequent modules, module B, 28, module C, module D etc. a graphite or metallic spacer, current collector disk, 20 is used to provide an expansion gap, 30 and electrical contact to the molybdenum current collector, 12 of the preceding cell. Multiple cell modules, 32 can be added in this manner to provide higher battery voltages. The negative current collector disk, 34 is then stacked in such a way as to provide electrical contact to the negative side of the last cell module in series. The stacked multiple cell modules, 32 are then compressed between the boron nitride disks, 36 and 38 using a compression spring, 26 and immobilized using stainless steel fastener rods or bolts 40 and 42. A positive current collector disk, 44 is in electrical contact with compression spring, 26. The assembled bipolar modular stack can then be sealed in a pyrex glass tube or electrically insulated metal container and affixed with the appropriate electrical feed-through and electrical connections. The sealed battery is activated when the electrolyte is liquefied by applying heat via an external heat source.

Figure 1:
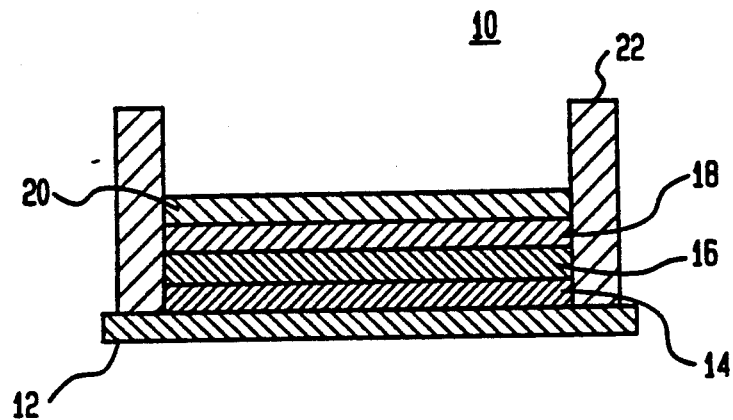
FIG. 1 is a cut-away side view of a high temperature molten salt cell module according to the invention.
Figure 2:
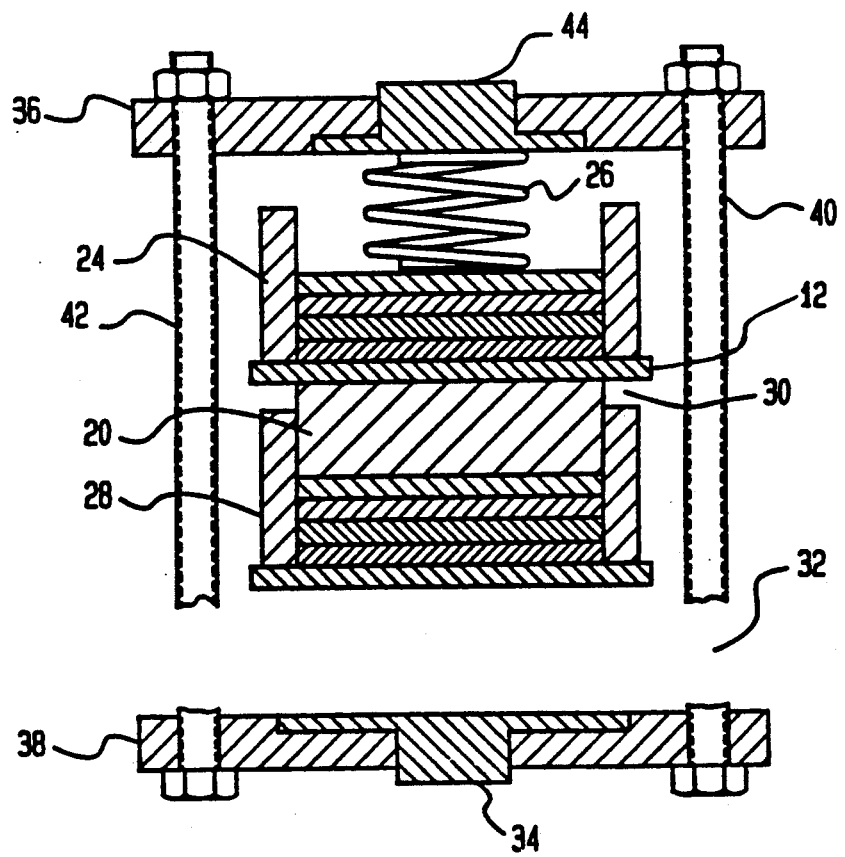
FIG. 2 is a cut-away side view of an assembled high temperature molten salt bipolar stacked module battery complete with compression spring and support hardwares.

In the high temperature molten salt bipolar stacked module battery according to the invention, the cathode active material may be $FeS_2$, $CoS_2$, $NiS_2$, FeS, NiS, CoS, $LiCoO_2$, $Co_3O_4$, other metal chalcogenides and mixtures thereof.

We wish it to be understood that we do not desire to be limited to the exact details of construction shown and described for obvious modifications will occur to a person skilled in the art.

What is claimed is:

1. A high temperature molten salt bipolar stacked module battery including a multiple cell module stack, each of said cell modules including, an anode disk, a separator disk atop the anode disk, a cathode disk atop the separator disk, and a current collector disk atop the cathode disk, the electrode disks and current collectors being stacked inside of a cylindrical boron nitride bushing, the boron nitride bushing acting to immobilize the electrodes and prevent electrical edge shorting, the stacked electrode disks contained inside the boron nitride bushing being stacked atop a molybdenum foil current collector that acts as the bipolar current collector between modules, the diameter of the molybdenum foil being the same as the outside diameter of the boron nitride bushing that contains the electrode disks so that when a multiple cell module stack is fabricated and the whole cell stack is heated to the operating temperature of the battery, the bipolar molybdenum foil will prevent the creepage of molten electrolyte from one cell module to the next cell module that would otherwise cause the electrical shorting of the cell stack, and wherein each cell module is stacked so that the positive current collector disk of each cell module is in direct contact with the negative current collector of a preceding cell module, the number of stacked cell modules being dependent on the desired total battery voltage since the bipolar stacking of the cell modules results in the sum of all of the stacked cell modules, the first cell module in the stack using a high temperature stainless steel compression spring as the positive pole current collector, the subsequent cell modules suing a metallically conductive spacer rod to provide an expansion gap and electrical contact to the molybdenum current collector of the preceding cell, and wherein the negative current collector disk is stacked to provide electrical contact to the negative side of the last cell module in the stack, the stacked cell modules being compressed between boron nitrate disks using the stainless steel compression spring and immobilized using stainless steel fastener rods, the assembled bibolar modular cell stack then being sealed in an electrically insulated metal container and affixed with appropriate electrical feed through and electrical connections.

2. A high temperature molten salt bipolar stacked module battery according to claim 1 wherein the cathode active material is selected from the group consisting of $FeS_2$, $CoS_2$, $NiS_2$, FeS, NiS, CoS, $LiCoO_2$, $Co_3O_4$, other metal chalcogenides and mixtures thereof.

3. A high temperature molten salt bipolar stacked module battery according to claim 2 wherein the cathode active material is $FeS_2$.

4. A high temperature molten salt bipolar stacked module battery according to claim 2 wherein the cathode active material is $LiCoO_2$.

5. A high temperature molten salt bipolar stacked module battery according to claim 2 wherein the cathode active material is $Co_3O_4$.

6. A high temperature molten salt bipolar stacked module battery according to claim 1 wherein the cathode active material is $FeS_2$, the electrolyte is a eutectic mixture of LiCl-KCl, and the anode is lithium aluminum-alloy.

* * * * *